(12) United States Patent
Kim et al.

(10) Patent No.: US 6,791,249 B2
(45) Date of Patent: Sep. 14, 2004

(54) CATHODE RAY TUBE

(75) Inventors: Seong-Seob Kim, Yongin (KR); Tok-Chin Woo, Kyungki-do (KR)

(73) Assignee: Samsung SDI Co., Ltd., Suwon-si (KR)

(*) Notice: Subject to any disclaimer, the term of this patent is extended or adjusted under 35 U.S.C. 154(b) by 0 days.

(21) Appl. No.: 10/428,935

(22) Filed: May 5, 2003

(65) Prior Publication Data

US 2003/0214211 A1 Nov. 20, 2003

(30) Foreign Application Priority Data

May 14, 2002 (KR) ........................................ 2002/26489

(51) Int. Cl.[7] .............................. H01J 19/40; H04N 9/29
(52) U.S. Cl. .............................. 313/313; 315/8; 315/85
(58) Field of Search ................................ 313/313, 479, 313/402, 431, 440; 315/8, 85, 370; 348/820; 361/149, 150, 267

(56) References Cited

U.S. PATENT DOCUMENTS 5,382,868 A * 1/1995 Fukaishi .................... 313/313
6,049,173 A * 4/2000 Murata et al. ................ 315/85

FOREIGN PATENT DOCUMENTS

| GB | 2217959 | * 11/1989 |
| JP | 08-306316 | 11/1996 |
| JP | 09-135451 | 5/1997 |

* cited by examiner

*Primary Examiner*—Ashok Patel
(74) *Attorney, Agent, or Firm*—Robert E. Bushnell, Esq.

(57) ABSTRACT

A cathode ray tube includes an evacuated envelope including a face panel, a funnel, and a neck; a color selection apparatus mounted inwardly from the face panel; an electron gun mounted within the neck; a magnetic shield mounted connected to the color selection apparatus; and degaussing coils mounted to an outer surface of the evacuated envelope. A degaussing current flowing to the degaussing coils has a waveform such that a line connecting a peak A from where a maximum current value first starts to decrease and a peak G of a sixth cycle is a functional curve of a second degree or greater.

20 Claims, 5 Drawing Sheets

CATHODE RAY TUBE

CLAIM OF PRIORITY

This application makes reference to, incorporates the same herein, and claims all benefits accruing under 35 U.S.C § 119 from an application entitled CATHODE RAY TUBE filed with the Korean Intellectual Property Office on May 14, 2002 and there duly assigned Serial No. 2002-26489.

BACKGROUND OF THE INVENTION

1. Technical Field

The present invention relates to a cathode ray tube, and more particularly, to a cathode ray tube that uses a degaussing coil for demagnetizing metal parts in the cathode ray tube such as a color selection apparatus and an inner shield.

2. Related Art

Metal parts are typically found in a cathode ray tube (CRT). Such metal parts include (a) a color selection apparatus comprised of a shadow mask that has a plurality of apertures for performing color separation of three electron beams, which are emitted from an electron gun, to corresponding red, green, blue (R,G,B) phosphors of a phosphor screen, and a mask frame for fixedly supporting the shadow mask at a predetermined location in the cathode ray tube (CRT); and (b) an inner shield for shielding from the earth's magnetic field a path through which the electron beams travel.

However, the metal parts nevertheless become magnetized by the earth's magnetic field so that a magnetic field is formed in the peripheries of the metal parts. Such a magnetic field changes the paths through which the electron beams travel such that the intended phosphors are not illuminated by the electron beams. That is, mis-landing of the electrons beams occurs, and this reduces picture quality.

To remedy this problem, a degaussing coil is mounted on an outer circumference of a funnel of the cathode ray tube (CRT). The degaussing coil operates for a period of three to four seconds each time the cathode ray tube (CRT) is turned on, during which time a degaussing current is used to demagnetize the color selection apparatus and the inner shield.

Examples of degaussing coil technology include a magnetic treatment method disclosed in Japanese Laid-Open Patent No. Heisei 8-306316 by Yoshida, published on Nov. 22, 1996, and an automatic demagnetizing circuit for a cathode ray tube (CRT) disclosed in Japanese Laid-Open Patent No. Heisei 9-13 5451 by Ikeda et al., published on May 20, 1997.

When using a degaussing coil for a cathode ray tube (CRT), it is essential that an initial current value of a power supplied to the degaussing coil is optimized so that the magnetization state of the metal elements maybe removed in a short interval and so that satisfactory restoration to a demagnetized state may be realized. However, with the art described above, no such specific disclosure of an optimal initial current value is provided. Accordingly, quick and sufficient demagnetization is not possible, thereby making actual application impractical.

SUMMARY OF THE INVENTION

The present invention provides a cathode ray tube capable of realizing demagnetization of metal parts of the cathode ray tube in a short period of time.

The present invention provides a cathode ray tube that improves the ability to restore metal parts to a demagnetized state.

In one embodiment, the present invention provides a cathode ray tube that includes an evacuated envelope including a face panel, a funnel, and a neck; a color selection apparatus mounted inwardly from the face panel; an electron gun mounted within the neck; a magnetic shield mounted connected to the color selection apparatus; and degaussing coils mounted to an outer surface of the evacuated envelope. A degaussing current flowing to the degaussing coils has a waveform such that a line connecting a peak A from where a maximum current value first starts to decrease and a peak G of a sixth cycle is a functional curve of a second degree or greater. And in this interval, the peak values are gradually decreased. That is, the first differential value of a function of the line connecting from peak A to peak G to time does not have zero.

If the maximum current value is $I_{p\text{-}p}$, a current value of a third cycle is $I_3$, and a current value of the sixth cycle is $I_6$, the following Equations 1 and 2 are satisfied, $$I_3/[(I_{p\text{-}p}+I_6)/2]>1.0 \quad \text{(Equation 1)}$$

$$(I_6/I_{p\text{-}p}) \geq 0.89 \quad \text{(Equation 2)}$$

In another embodiment, the present invention provides a cathode ray tube that includes an evacuated envelope including a face panel, a funnel, and a neck; a color selection apparatus mounted inwardly from the face panel; an electron gun mounted within the neck; a magnetic shield mounted connected to the color selection apparatus; and degaussing coils mounted to an outer surface of the evacuated envelope. A degaussing current flowing to the degaussing coils has a waveform such that a line connecting a peak A from where a maximum current value first starts to decrease and a peak F of a fifth cycle is a functional curve of a second degree or greater.

If a line connecting the peak A to a point H where the functional curve changes direction is AH, a line connecting the peak F to a point I on line AH where a line drawn through the peak F perpendicularly intersects the line AH is FI, a length of line AI connecting the peak A to point I is $L_1$, and a length of line FI is $L_2$, the lengths $L_1$ and $L_2$ satisfy the following Equation 3, and if a maximum inrush current is $I_{p\text{-}p}$ and a current of the fifth cycle is $I_5$, the following Equation 4 is satisfied, $$(L_1/L_2)<3.0 \quad \text{(Equation 3)}$$

$$(I_5/I_{p\text{-}p}) \geq 0.9 \quad \text{(Equation 4)}$$

The degaussing current is damped by a right temperature characteristic thermistor.

The color selection apparatus includes a mask frame having support members provided at predetermined spacings, and a pair of elastic members, each of which is connected to the support members extending from one support member to an opposing support member; and a mask having a plurality of apertures for the passage of electron beams, the mask being connected to the supported members in a state receiving tension.

The degaussing coils include a first degaussing coil and a second degaussing coil mounted at opposing positions about the electron gun, the first degaussing coil and the second degaussing coil being connected in series.

In accordance with the principles of the present invention, as embodied and broadly described, the present invention provides a cathode ray tube, comprising: an evacuated envelope including a face panel, a funnel, and a neck; a color selection apparatus being adjacent to the face panel; an electron gun being mounted within the neck; a magnetic shield being mounted to said color selection apparatus; and degaussing coils being mounted to an outer surface of said evacuated envelope, with a degaussing current flowing to said degaussing coils, the degaussing current having a waveform with a line connecting a peak A and a peak G, the peak A corresponding to a point where a maximum current value first starts to decrease, the peak G corresponding to a peak of a sixth cycle, the line corresponding to a functional curve, the functional curve corresponding to one curve selected from a curve of second degree and a curve of a greater degree than second degree.

In accordance with the principles of the present invention, as embodied and broadly described, the present invention provides a cathode ray tube, comprising: an evacuated envelope including a face panel, a funnel, and a neck; a color selection apparatus being adjacent to the face panel; an electron gun being mounted within the neck; a magnetic shield being mounted to said color selection apparatus; and degaussing coils being mounted to an outer surface of said evacuated envelope, with a degaussing current flowing to said degaussing coils, the degaussing current having a waveform with a line AF connecting a peak A and a peak F, the peak A corresponding to a point where a maximum current value first starts to decrease, the peak F corresponding to a peak of a fifth cycle, the line AF corresponding to a functional curve, the functional curve corresponding to one curve selected from a curve of second degree and a curve of a greater degree than second degree.

In accordance with the principles of the present invention, as embodied and broadly described, the present invention provides an apparatus, comprising: at least one degaussing coil being mounted to an outer surface of an evacuated envelope of a cathode ray tube, with a degaussing current selectively flowing to said at least one degaussing coil, the degaussing current having a waveform with a line connecting a peak A and a peak G, the peak A corresponding to a point where a maximum current value first starts to decrease, the peak G corresponding to a peak of a sixth cycle, the line corresponding to a functional curve, the functional curve corresponding to one curve selected from a curve of second degree and a curve of a greater degree than second degree.

In accordance with the principles of the present invention, as embodied and broadly described, the present invention provides an apparatus, comprising: at least one degaussing coil being mounted to an outer surface of an evacuated envelope of a cathode ray tube, with a degaussing current flowing to said at least one degaussing coil, the degaussing current having a waveform with a line AF connecting a peak A and a peak F, the peak A corresponding to a point where a maximum current value first starts to decrease, the peak F corresponding to a peak of a fifth cycle, the line AF corresponding to a functional curve, the functional curve corresponding to one curve selected from a curve of second degree and a curve of a greater degree than second degree.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF BEST MODE OF CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Preferred embodiments of the present invention will now be described in detail with reference to the accompanying drawings.

Figure 1:
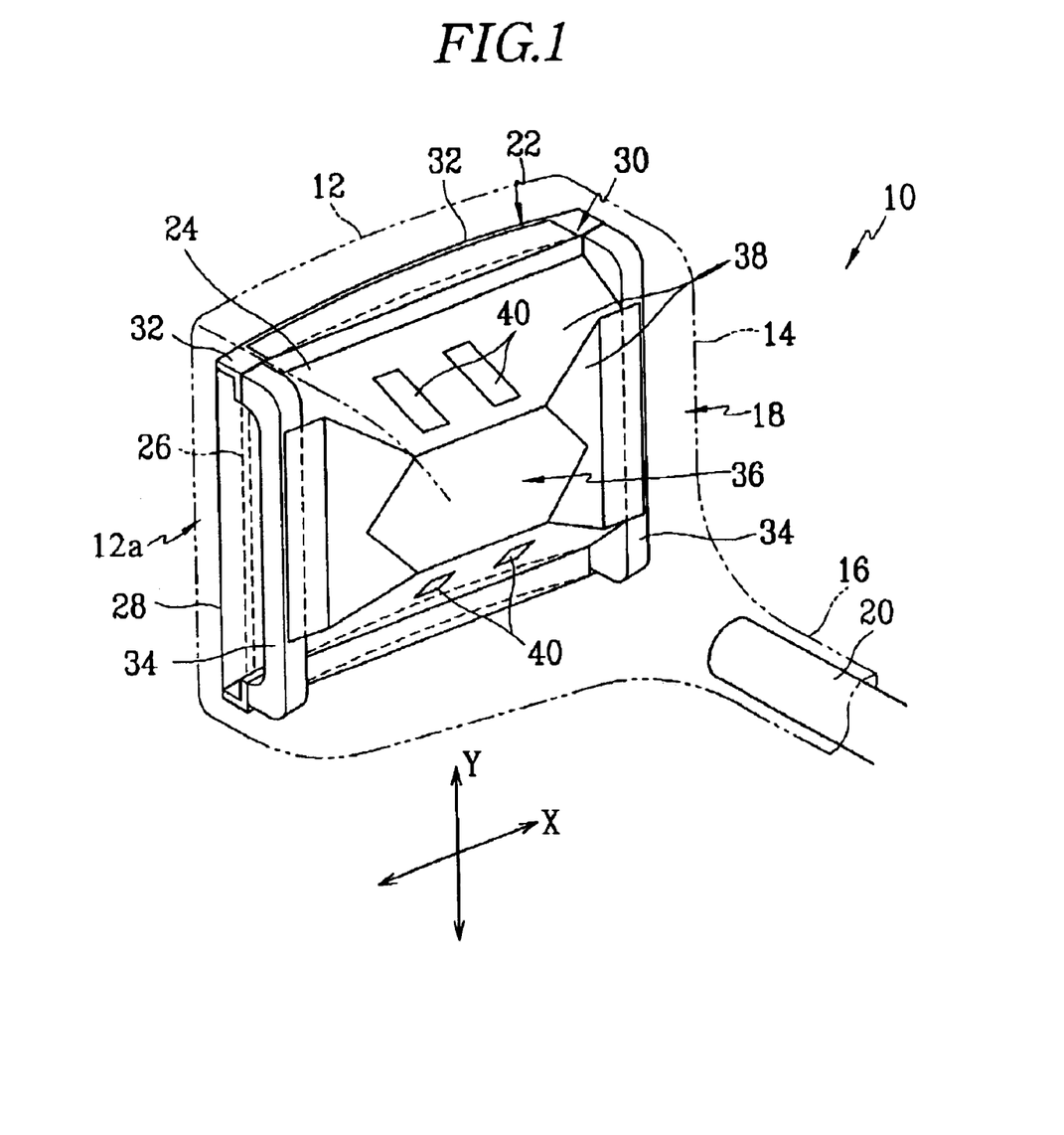
FIG. 1 is a rear perspective, partially transparent view used to describe an inner structure of a cathode ray tube, in accordance with the principles of the present invention.
Figure 2:
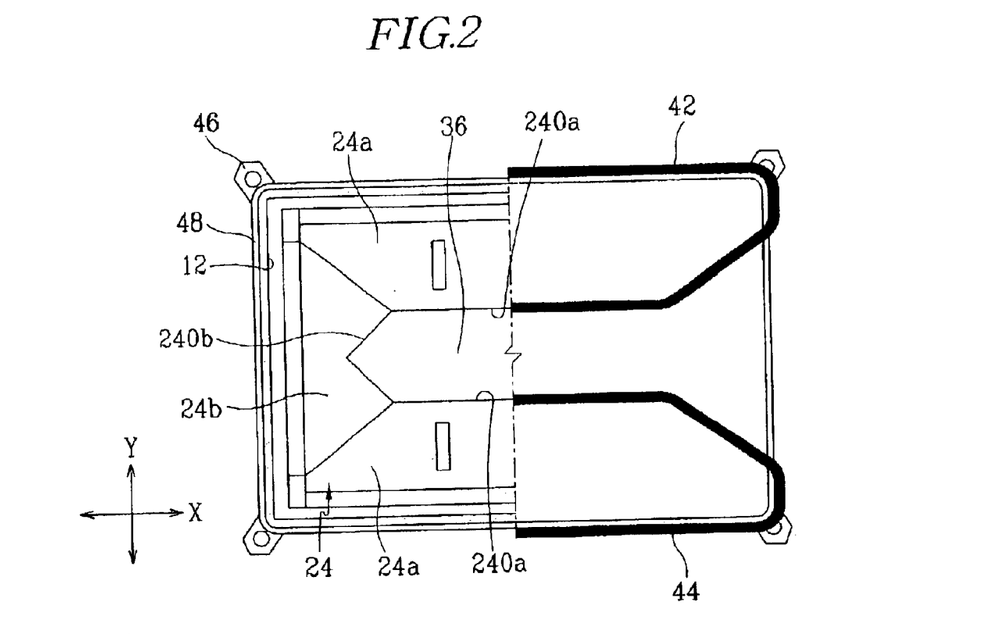
FIG. 2 is a partially cutaway rear view of the cathode ray tube of FIG. 1, in accordance with the principles of the present invention.

FIG. 1 is a rear perspective, partially transparent view used to describe an inner structure of a cathode ray tube, in accordance with the principles of the present invention. FIG. 2 is a partially cutaway rear view of the cathode ray tube of FIG. 1, in accordance with the principles of the present invention.

With reference to the drawings, an exterior of the cathode ray tube (CRT) 10 according to the preferred embodiment of the present invention is defined by an evacuated envelope 18, which is formed by the fusing of a panel 12, a funnel 14, and a neck 16 into an integral unit. The evacuated envelope 18 is evacuated to realize a vacuum state therein of a pressure between $10^{-7}$ and $10^{-10}$ torr.

The panel 12 includes a front face that forms a phosphor screen (not shown) comprised of R,G,B phosphors, and a skirt 12a that extends toward the funnel 14 from an outer circumference of the front face of the panel 12. Mounted in the neck 16, which is fused to the opposite side of the funnel 14 as the panel 12, is an electron gun 20. The electron gun 20 emits electron beams toward the phosphor screen. A deflection unit (not shown) is formed around an outer circumference of the funnel 14. The deflection unit generates an electric field for deflecting the electron beams.

In addition, a color selection apparatus 22 is mounted inwardly from the panel 12. The color selection apparatus 22 separates R,G,B electron beams emitted from the electron gun 20 to corresponding R,G,B phosphors of the phosphor screen. Further, a magnetic shield 24 is mounted within the evacuated envelope 18 in a state connected to the color selection apparatus 22. The magnetic shield 24 blocks the earth's magnetic field from the path of the electron beams so that the earth's magnetic field does not act to mis-direct the electron beams.

In the embodiment, the color selection apparatus 22 includes a mask 28 having a plurality of apertures 26 and that is mounted receiving tension in a direction corresponding to a short side of the panel 12 (the axis Y direction in the drawing), and a mask frame 30 for fixedly supporting the mask 28. The mask frame 30 includes support members 32 connected to the mask 28 at each corner area thereof, and a pair of elastic members 34, each of which extends in the axis Y direction and is connected to the support members 32 on opposite ends of the mask 28.

The color selection apparatus 22 is mounted inwardly from the panel 12 by the demountable connection of a connecting spring (not shown), which is connected to the mask frame 30, to stud pins (not shown). The stud pins are fixed to an inside surface of the skirt 12a of the panel 12.

Further, the magnetic shield 24 is fixed to the mask frame 30 and partly surrounds the path through which the electron beams pass within the funnel 14. The magnetic shield 24 is realized through a plurality of side walls 38 (typically four), which when combined form a center opening 36. The center opening 36 of the magnetic shield 24 is formed by the meeting of distal ends of the side walls 38. That is, the side walls 38 include a pair of long side walls 24a mounted to the mask frame 30 extending along the axis X direction and slanted toward a long axis of the cathode ray tube (CRT), non-connected ends of the long side walls 24a forming long edges 240a; and a pair of short side walls 24b mounted to the mask frame 30 extending along the axis Y direction and slanted toward the long axis of the cathode ray tube (CRT), non-connected ends of the short side walls 24b forming short edges 240b. The long edges 240a and the short edges 240b converge to form the center opening 36. The long edges 240a of the long side walls 24a are parallel to each other, that is, are straight and formed along the axis X direction. In addition, each of the long side walls 24a have formed therein a pair of holes 40.

Since the color selection apparatus 22 and the magnetic shield 24 configured as in the above are made of metal, they become magnetized by the earth's magnetic field during operation of the cathode ray tube (CRT). This may affect the path of the electron beams. Therefore, degaussing coils 42 and 44 are mounted to an outer surface of the evacuated envelope 18 for demagnetizing the color selection apparatus 22 and the magnetic shield 24.

In the embodiment, there is provided a pair of degaussing coils (i.e., the degaussing coils 42 and 44), and the degaussing coils 42 and 44 are mounted to the outside of the evacuated envelope 18 in a state opposing one another. The degaussing coils 42 and 44 are separated a predetermined distance where the center opening 36 is formed. However, this is just one example of how degaussing coils may be provided in the present invention, and other configurations are also possible. For example, a single, integrally formed degaussing coil may be mounted on the evacuated envelope 18.

The cathode ray tube (CRT) also includes an implosion preventing band 48 mounted on an outer surface of the skirt 12a of the face panel 12. The implosion preventing band 48 includes ears 46 that are used for mounting the evacuated envelope 18 in a cabinet (not shown).

Figure 3:
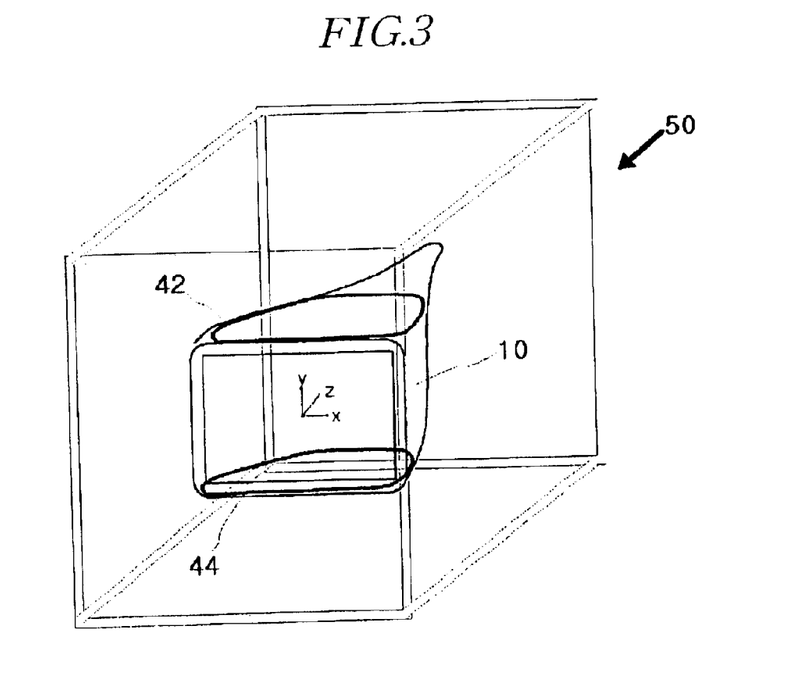
FIG. 3 is a schematic perspective view of an apparatus for performing demagnetization, in accordance with the principles of the present invention.

FIG. 3 is a schematic perspective view of an apparatus for performing demagnetization, in accordance with the principles of the present invention. Using a Helmholtz coil, the device 50 generates a direct current bias magnetic field in each of the axis X, Y, and Z directions of the cathode ray tube (CRT) 10, to thereby form a specific external magnetic field. Also, an alternating current (AC) inrush current made to flow to the degaussing coils 42 and 44 uses the typical power source. The typical power source is 100–220 volts (V) and 50 hertz (Hz) or 60 Hz. A magnetomotive force of an alternating current (AC) attenuating magnetic field is 2300AT.

The magnetic field within the device 50 is set zero when the cathode ray tube (CRT) 10 is not provided therein. After the cathode ray tube (CRT) 10 is mounted within the device 50, an AC attenuating magnetic field is made to flow to the degaussing coils 42 and 44.

Figure 4:
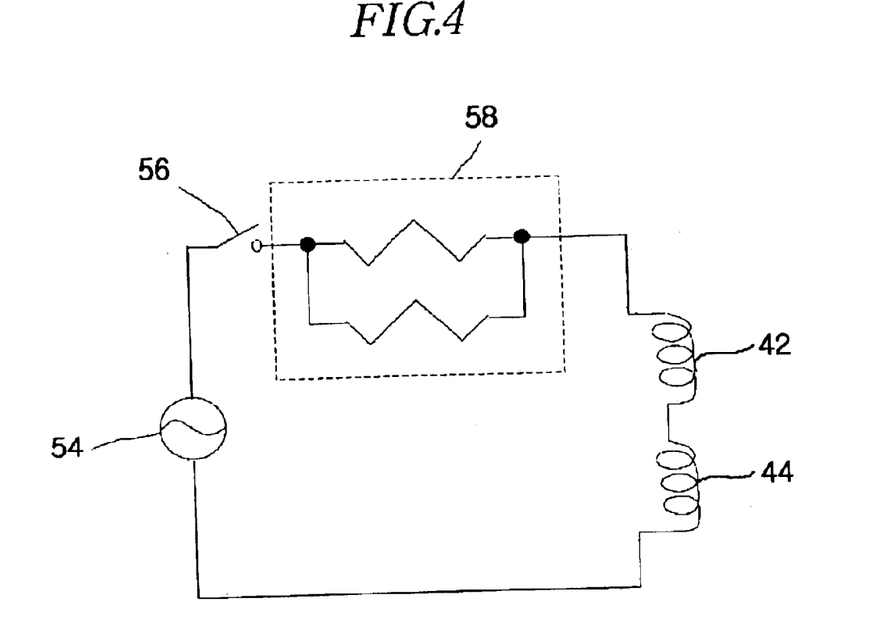
FIG. 4 is a circuit diagram of a circuit for generating a degaussing current, in accordance with the principles of the present invention.

FIG. 4 is a circuit diagram of a circuit for generating a degaussing current, in accordance with the principles of the present invention. With reference to FIG. 4, a degaussing circuit of the present invention for performing this operation of making an AC attenuating magnetic field flow to the degaussing coils 42 and 44 includes an alternating current (AC) source 54, a switch 56, the degaussing coils 42 and 44, and a right temperature characteristic thermistor 58 that controls the current flowing to the degaussing coils 42 and 44. In the degaussing circuit structured in this manner, a closed loop is formed with the closing of the switch 56 such that an alternating current of the AC power source 54 flows to the degaussing coils 42 and 44 after passing through the right temperature characteristic thermistor 58.

Accordingly, the right temperature characteristic thermistor 58 is heated to increase its temperature. This increases a resistance of the right temperature characteristic thermistor 58 such that ultimately, the current in the circuit reduces to zero. In this circuit, a 220 volts (V), 60 hertz (Hz) alternating current (AC) source was used; the right temperature characteristic thermistor 58 used a 4.5 ohms ($\Omega$) capacity; and the degaussing coils 42 and 44, which have an internal resistance of 10$\Omega$, were connected in series.

In the following, uppermost points of an attenuating waveform of the degaussing current are connected to describe attenuating characteristics from the resulting shape. This is made possible because stability with respect to current magnetic flux density following demagnetization can be determined from a maximum offset AC current value where degaussing current offset starts according to attenuating waveform characteristics during a fifth or sixth cycle (100 milliseconds (ms) in the case of a 60 Hz AC power source).

Figure 5:
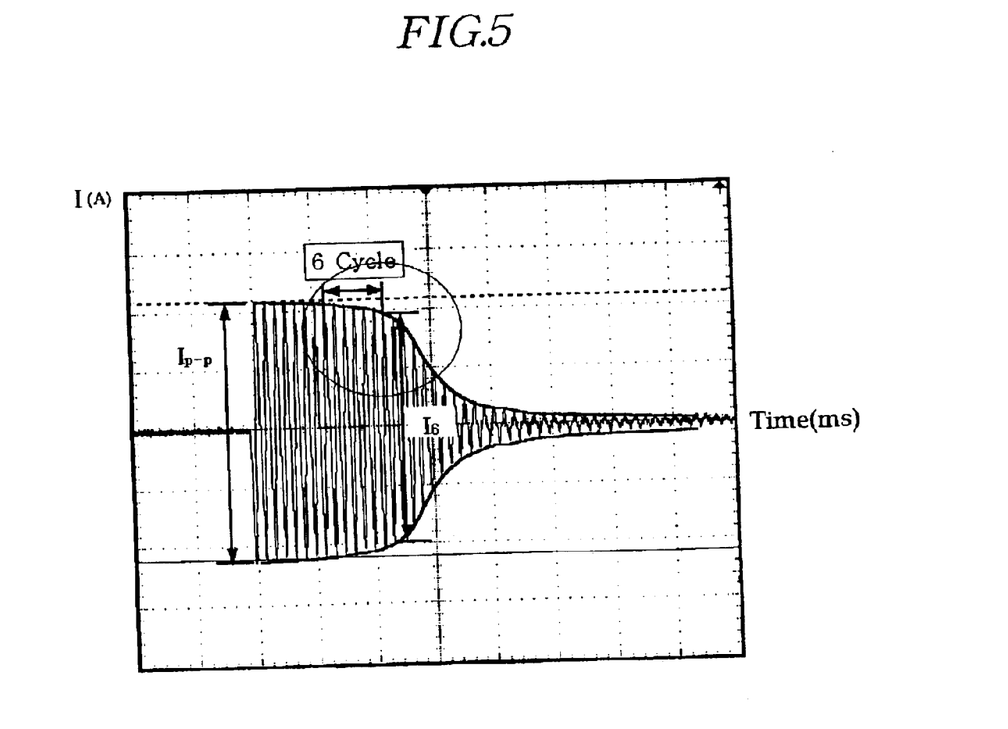
FIG. 5 is a waveform diagram of a degaussing current according to a first preferred embodiment of the present invention.
Figure 6:
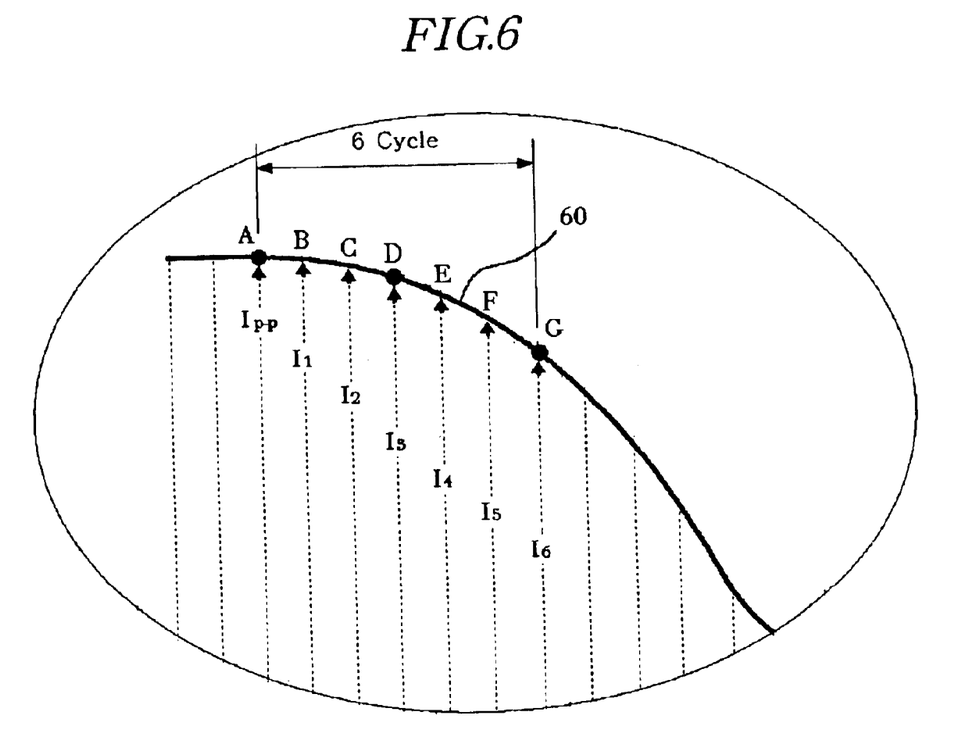
FIG. 6 is an enlarged view of the area encompassed by the circle of FIG. 5, in accordance with the principles of the present invention.

FIG. 5 is a waveform diagram of a degaussing current according to a first preferred embodiment of the present invention. FIG. 6 is an enlarged view of the area encompassed by the circle of FIG. 5, in accordance with the principles of the present invention.

As shown in the drawings, if a peak of a maximum inrush alternating current (AC) current value $I_{p-p}$ where degaussing current attenuating starts is A, and if peaks of inrush AC current values $I_1$, $I_2$, $I_3$, $I_4$, $I_5$, and $I_6$ on the attenuating waveform curve starting from the maximum inrush AC current value $I_{p-p}$ to the sixth cycle are respectively B, C, D, E, F, and G, a line 60 connecting the peaks (A through G) is designed so that it is a functional curve of a second degree or greater. In second degree curves, for example, unknowns are expressed to no higher degree than the second power. Examples of second degree curves include circles, ellipses, and parabolas. The maximum inrush AC current value $I_{p-p}$, the inrush current value I3 of the third cycle, and the inrush current value $I_6$ of the sixth cycle simultaneously satisfy both the constraints of Equations 1 and 2.

$$I_3/[(I_{p-p}+I_6)/2] \geq 1.0 \quad \text{(Equation 1)}$$

$$(I_6/I_{p-p}) \geq 0.89 \quad \text{(Equation 2)}$$

Figure 7:
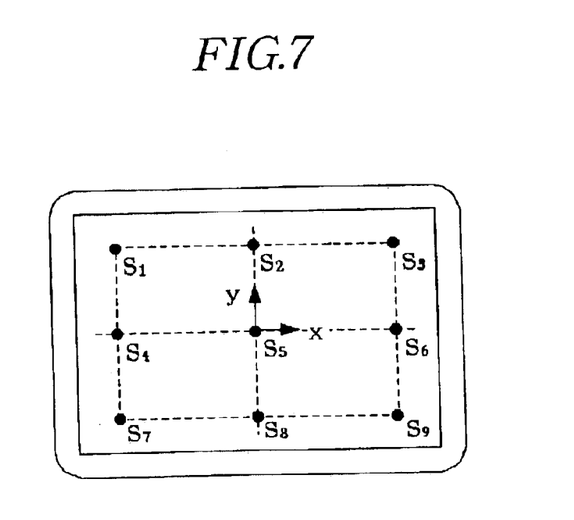
FIG. 7 is a drawing used to describe measuring points of electron beam movement in a cathode ray tube, in accordance with the principles of the present invention.

Table 1 below shows results of multiple measurements of electron beam movement while the relative values of the current values $I_{p-p}$, $I_3$, and $I_6$ are varied. Amounts of magnetic field movement with respect to four points S1, S3, S7, and S9 of a screen shown in FIG. 7 are divided into an average component Ave, a horizontal component H, a vertical component V, and a rotating component R, and repeatedly measured to determine changes in movement Δ to thereby evaluate restoration to a demagnetized state.

TABLE 1

| No. | Cycle current values (A) | | | $I_3/$ $[(I_{p-p}+I_6)/2]$ | $I_6/I_{p-p}$ | Electron beam landing movement (μm) | | | |
|---|---|---|---|---|---|---|---|---|---|
| | $I_{p-p}$ | $I_3$ | $I_6$ | | | Ave | ΔH | ΔV | ΔR |
| 1 | 22.0 | 21.0 | 19.7 | 1.01 | 0.89 | 2.0 | 0.5 | 1.0 | 1.5 |
| 2 | 22.1 | 19.1 | 12.1 | 1.12 | 0.55 | 2.8 | 21.7 | 3.8 | 1.3 |
| 3 | 36.3 | 29.3 | 8.8 | 1.30 | 0.24 | 1.8 | 10.8 | 1.3 | 1.8 |

As shown in Table 1, if the value of $I_3/[(I_{p-p}+I_6)/2]$ is greater than 1.0 and the value of $I_6/I_{p-p}$ is greater than or equal to 0.89 (for example, as shown in row No. 1), the changes in movement Δ with respect to all components of the electron beam landing movement exhibit stable values comparable to when affected by only the earth's magnetic field in a natural setting. However, when both conditions are not met (for example, as shown in row Nos. 2 and 3), the change in magnetic field movement ΔH of the horizontal component is significantly increased. This indicates that residual magnetic flux density is unstable following demagnetization such that a magnetization of a few gauss is generated in the vertical direction (axis Y direction).

Therefore, if design is performed such that the waveform of the demagnetizing attenuating AC satisfies Equations 1 and 2, it is possible to ensure that metal parts such as a color selection apparatus and a magnetic shield are fully demagnetized. Also, the residual magnetic flux density following demagnetization is stable to thereby improve restoration to a demagnetized state. In addition, if an external magnetic field is generated in the device 50 of FIG. 3 to carry out the above example, effects identical to those shown in Table 1 were able to be obtained.

Figure 8:
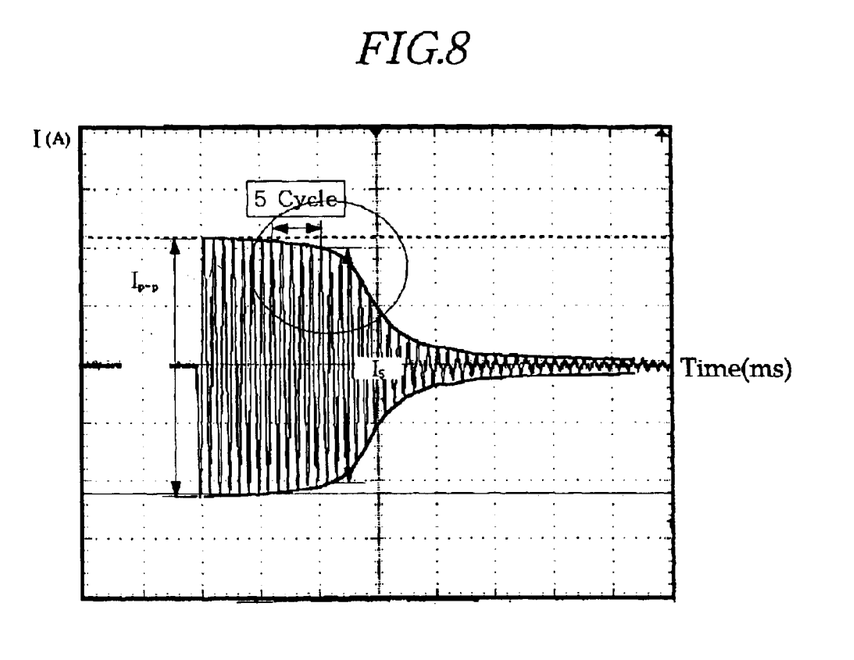
FIG. 8 is a waveform diagram of a degaussing current according to a second preferred embodiment of the present invention.
Figure 9:
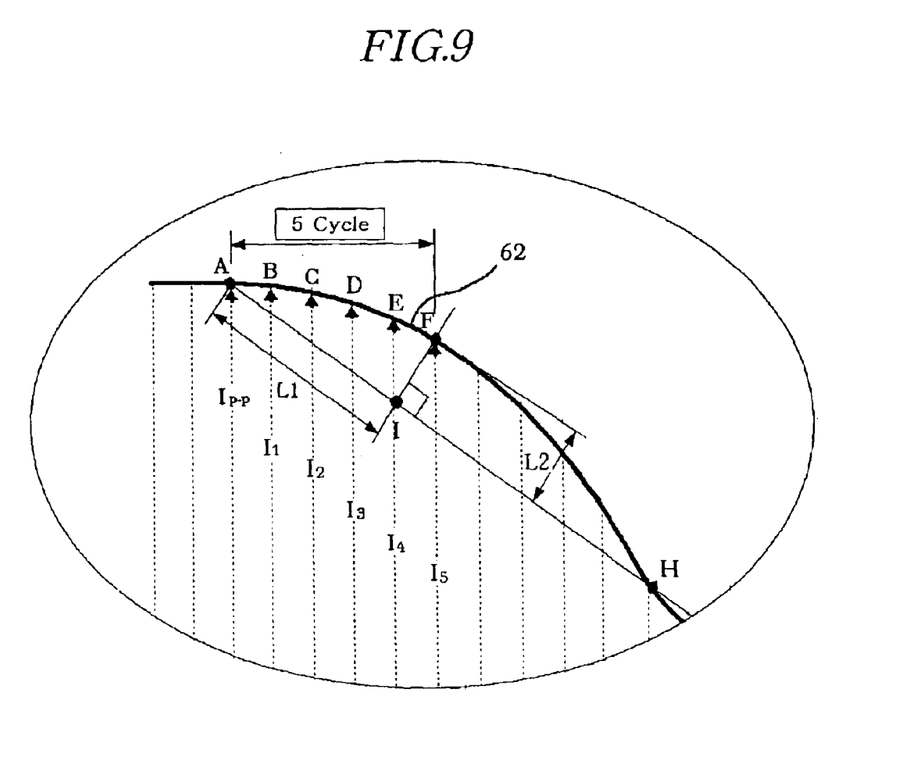
FIG. 9 is an enlarged view of the area encompassed by the circle of FIG. 8, in accordance with the principles of the present invention.

FIG. 8 is a waveform diagram of a degaussing current according to a second preferred embodiment of the present invention. FIG. 9 is an enlarged view of the area encompassed by the circle of FIG. 8, in accordance with the principles of the present invention.

As shown in the drawings, if a peak of a maximum inrush AC current value $I_{p-p}$ where degaussing current attenuating starts is A, and if peaks of inrush AC current values $I_1$, $I_2$, $I_3$, $I_4$, and $I_5$ on the attenuating waveform curve starting from the peak A to the fifth cycle are respectively B, C, D, E, and F, a line 62 connecting the peaks (A through F) is designed so that it is a functional curve of a second degree or greater. Further, if a line connecting the peak A to a point H where the curve changes direction is AH, a line connecting the last point F to a point I on line AH where a line drawn through the point F perpendicularly intersects the line AH is FI, a length of line AI is $L_1$, and a length of line FI is $L_2$, the lengths $L_1$ and $L_2$ satisfy the following Equation 3. Also, the inrush AC current values $I_{p-p}$ and $I_5$ satisfy the following Equation 4.

$$(L_1/L_2) < 3.0 \quad \text{(Equation 3)}$$

$$(I_5/I_{p-p}) \geq 0.9 \quad \text{(Equation 4)}$$

TABLE 2

| | Demagnetization waveform conditions | | | | | Electron beam landing movement (μm) | | | |
|---|---|---|---|---|---|---|---|---|---|
| | Current | | | | | | | | |
| No. | Value (A) | | L | $L_1/L_2$ | $I_5/I_{p-p}$ | Ave | ΔH | ΔV | ΔR |
| 1 | $I_{p-p}$ | 22.0 | $L_1$ | 1.75 | 2.8 | 0.91 | 2.0 | 0.5 | 1.0 | 1.5 |
| | $I_5$ | 19.9 | $L_2$ | 0.62 | | | | | | |
| 2 | $I_{p-p}$ | 21.0 | $L_1$ | 1.50 | 4.8 | 0.71 | 2.8 | 21.7 | 3.8 | 1.3 |
| | $I_5$ | 15.0 | $L_2$ | 0.31 | | | | | | |
| 3 | $I_{p-p}$ | 36.3 | $L_1$ | 4.10 | 14.1 | 0.39 | 1.8 | 10.8 | 1.3 | 1.8 |
| | $I_5$ | 14.0 | $L_2$ | 0.29 | | | | | | |

In Table 2, there are shown results of repeatedly measuring landing movements of the electron beams five or more times as the relation between the current values $I_{p-p}$ and $I_5$ is varied. The landing movements with respect to the four points of the screen $S_1$, $S_3$, $S_7$, and $S_9$ (shown in FIG. 7) are divided into average value components Ave, horizontal components H, vertical components V, and rotating components R, and the change ΔH in the landing movements with respect to the repeated measurements is calculated to thereby evaluate restoration to a demagnetized state.

As shown in Table 2, when a ratio of $L_1/L_2$ is 3.0 or less and a ratio of $I_5/I_{p-p}$ is 0.9 or more (for example, in row No. 1), the differences Δ with respect to all components of the landing movement exhibited stable values similar to values resulting from the earth's magnetic field in a natural setting. However, in all other conditions (for example, in row Nos. 2 and 3), the landing movement difference of the horizontal component ΔH was large. This indicates that residual magnetic flux density is unstable following demagnetization such that a magnetization of a few gauss is generated in the vertical direction (axis Y direction).

Therefore, if design is performed such that the waveform of the demagnetizing attenuating AC satisfies Equations 3 and 4, it is possible to ensure that metal parts such as a color selection apparatus and a magnetic shield are fully demagnetized. Also, the residual magnetic flux density following demagnetization is stable to thereby improve restoration to a demagnetized state. In addition, demagnetization may be performed in 0.5 seconds or less. Finally, if an external magnetic field is generated in the device 50 of FIG. 3 to carry out the above example, effects identical to those shown in Table 2 were able to be obtained.

In the cathode ray tube (CRT) of the present invention structured and operating as in the above, by optimizing the attenuating ratio and the shape of the attenuating curve during the first 5 or 6 cycles when the alternating current (AC) degaussing current starts to decrease, demagnetization may be completed in a quick time of less than 1 second, and restoration to a demagnetized state by stabilization of the residual magnetic flux density following demagnetization is improved.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit and scope of the applicant's general inventive concept.

What is claimed is:

1. A cathode ray tube, comprising:
    an evacuated envelope including a face panel, a funnel, and a neck;
    a color selection apparatus being adjacent to the face panel;
    an electron gun being mounted within the neck;
    a magnetic shield being mounted to said color selection apparatus; and
    degaussing coils being mounted to an outer surface of said evacuated envelope, with a degaussing current flowing to said degaussing coils, the degaussing current having a waveform with a line connecting a peak A and a peak G, the peak A corresponding to a point where a maximum current value first starts to decrease, the peak G corresponding to a peak of a sixth cycle, the line corresponding to a functional curve, the functional curve corresponding to one curve selected from a curve of second degree and a curve of a greater degree than second degree.

2. The cathode ray tube of claim 1, further comprising a function of the line connecting the peak A through peak G to time having differential values selected from among values greater than zero and values less than zero.

3. The cathode ray tube of claim 1, further comprising Equations 1 and 2 being satisfied, where Equation 1 is $$I_3/[(I_{p\text{-}p}+I_6)/2]>1.0,$$

and Equation 2 is $$(I_6/I_{p\text{-}p})\geq 0.89,$$

where $I_{p\text{-}p}$ corresponds to maximum current value, $I_3$ corresponds to a current value of a third cycle, and $I_6$ corresponds to a current value of the sixth cycle.

4. The cathode ray tube of claim 1, further comprising a right temperature characteristic thermistor damping the degaussing current.

5. The cathode ray tube of claim 1, with said color selection apparatus comprising:
    a mask frame including at least two support members and at least two elastic members, the at least two support members being spaced apart a predetermined distance, each one of the two elastic members being connected to the at least two support members, each one of the two elastic members extending from one of the at least two support members to a distinguishable one of the at least two support members; and
    a mask including a plurality of apertures for the passage of electron beams, said mask being connected to the at least two support members and being under tension.

6. The cathode ray tube of claim 1, with said degaussing coils including a first degaussing coil and a second degaussing coil, the first and second coils being mounted in positions corresponding to opposing sides of said electron gun, the first and second coils being connected in series.

7. A cathode ray tube, comprising:
    an evacuated envelope including a face panel, a funnel, and a neck;
    a color selection apparatus being adjacent to the face panel;
    an electron gun being mounted within the neck;
    a magnetic shield being mounted to said color selection apparatus; and
    degaussing coils being mounted to an outer surface of said evacuated envelope, with a degaussing current flowing to said degaussing coils, the degaussing current having a waveform with a line AF connecting a peak A and a peak F, the peak A corresponding to a point where a maximum current value first starts to decrease, the peak F corresponding to a peak of a fifth cycle, the line AF corresponding to a functional curve, the functional curve corresponding to one curve selected from a curve of second degree and a curve of a greater degree than second degree.

8. The cathode ray tube of claim 7, further comprising a function of the line AF connecting the peak A through peak F to time having differential values selected from among values greater than zero and values less than zero.

9. The cathode ray tube of claim 7, further comprising Equation 3 being satisfied, where Equation 3 is $$(L_1/L_2)<3.0,$$

where a straight line AH connects the peak A to a point H, with point H corresponding to a position where the functional curve changes a direction of curvature, where a straight line FI connects the peak F to a point I, with the point I being on the line AH between the peak A and the point H, with the line FI being perpendicular to the line AH, where a line AI connects the peak A to point I and corresponds to a portion of the line AH, where a length $L_1$ corresponds to length of the line AI, where a length $L_2$ corresponds to length of the line FI.

10. The cathode ray tube of claim 9, further comprising Equation 4 being satisfied, where Equation 4 is $$(I_5/I_{p\text{-}p})\geq 0.9,$$

where $I_{p\text{-}p}$ corresponds to a maximum inrush current, and $I_5$ corresponds to a current of the fifth cycle.

11. The cathode ray tube of claim 7, further comprising a right temperature characteristic thermistor damping the degaussing current.

12. The cathode ray tube of claim 7, with said color selection apparatus comprising:
    a mask frame including at least two support members and at least two elastic members, the at least two support members being spaced apart a predetermined distance, each one of the two elastic members being connected to the at least two support members, each one of the two elastic members extending from one of the at least two support members to a distinguishable one of the at least two support members; and a mask including a plurality of apertures for the passage of electron beams, said mask being connected to the at least two support members and being under tension.

13. The cathode ray tube of claim 7, with said degaussing coils including a first degaussing coil and a second degaussing coil, the first and second coils being mounted in positions corresponding to opposing sides of said electron gun, the first and second coils being connected in series.

14. An apparatus, comprising:

at least one degaussing coil being mounted to an outer surface of an evacuated envelope of a cathode ray tube, with a degaussing current selectively flowing to said at least one degaussing coil, the degaussing current having a waveform with a line connecting a peak A and a peak G, the peak A corresponding to a point where a maximum current value first starts to decrease, the peak G corresponding to a peak of a sixth cycle, the line corresponding to a functional curve, the functional curve corresponding to one curve selected from a curve of second degree and a curve of a greater degree than second degree.

15. The apparatus of claim 14, further comprising Equations 1 and 2 being satisfied, where Equation 1 is $$I_3/[(I_{p\text{-}p}+I_6)/2]>1.0,$$

and Equation 2 is $$(I_6/I_{p\text{-}p})\geq 0.89,$$

where $I_{p\text{-}p}$ corresponds to maximum current value, $I_3$ corresponds to a current value of a third cycle, and $I_6$ corresponds to a current value of the sixth cycle.

16. The apparatus of claim 15, further comprising a right temperature characteristic thermistor damping the degaussing current, the evacuated envelope including a color selection unit.

17. The apparatus of claim 1, said at least one degaussing coil including a first degaussing coil and a second degaussing coil, the first and second coils being connected in series.

18. An apparatus, comprising:

at least one degaussing coil being mounted to an outer surface of an evacuated envelope of a cathode ray tube, with a degaussing current flowing to said at least one degaussing coil, the degaussing current having a waveform with a line AF connecting a peak A and a peak F, the peak A corresponding to a point where a maximum current value first starts to decrease, the peak F corresponding to a peak of a fifth cycle, the line AF corresponding to a functional curve, the functional curve corresponding to one curve selected from a curve of second degree and a curve of a greater degree than second degree.

19. The apparatus of claim 18, further comprising Equation 3 being satisfied, where Equation 3 is $$(L_1/L_2)<3.0,$$

where a straight line AH connects the peak A to a point H, with point H corresponding to a position where the functional curve changes a direction of curvature, where a straight line FI connects the peak F to a point I, with the point I being on the line AH between the peak A and the point H, with the line FI being perpendicular to the line AH, where a line AI connects the peak A to point I and corresponds to a portion of the line AH, where a length $L_1$ corresponds to length of the line AI, where a length $L_2$ corresponds to length of the line FI.

20. The apparatus of claim 18, further comprising Equation 4 being satisfied, where Equation 4 is $$(I_5/I_{p\text{-}p})\geq 0.9,$$

where $I_{p\text{-}p}$ corresponds to a maximum inrush current, and $I_5$ corresponds to a current of the fifth cycle.

* * * * *